United States Patent [19]

Kruger et al.

[11] Patent Number: 4,536,790
[45] Date of Patent: Aug. 20, 1985

[54] APPARATUS AND METHOD FOR FLUOROSCOPIC IMAGING OF A BODY

[75] Inventors: Robert A. Kruger, Sandy, Utah; Wayne Bateman, Sunnyvale, Calif.

[73] Assignee: Thomson-CSF Broadcast, Inc., Stamford, Conn.

[21] Appl. No.: 444,614

[22] Filed: Nov. 26, 1982

[51] Int. Cl.³ .............................................. H04N 7/18
[52] U.S. Cl. ...................................... 358/111; 378/99; 128/654; 128/691
[58] Field of Search ................... 358/111, 183; 378/99, 378/4, 5, 8; 128/653, 654, 691; 364/414, 416; 250/356.1, 356.2

[56] References Cited

U.S. PATENT DOCUMENTS 4,335,427 6/1982 Hunt et al. ............................ 358/111
4,467,352 8/1984 Saalfrank ............................. 358/111

Primary Examiner—John C. Martin
Assistant Examiner—Edward L. Coles
Attorney, Agent, or Firm—Martin M. Novack

[57] ABSTRACT

The disclosure is directed to a method and apparatus for generating a processed video image of a fluid-carrying vessel in a body, and can also be used to obtain information concerning the flow rate of blood in the vessel. In the disclosed method, a contrast medium is injected into the body, typically into the vessel to be imaged or leading into the vessel to be imaged. A source of X-radiation is directed at the body, and radiation which passes through the body is detected and converted into a series of frames of electronic video signals, preferably in digital form. The frames represent images of the radiation transmission characteristics of the body at a series of successive times. Each frame includes an array of pixels, the video level at each pixel of a frame being determined by the radiation transmissivity of the body through an elemental region thereof. A processed video image can then be displayed which has a video parameter, such as luminance, that depends, at each pixel, on a time-representative value for the pixel. This processed image shows the progress of the contrast material, as a function of time, through the vessel of interest.

17 Claims, 3 Drawing Figures

APPARATUS AND METHOD FOR FLUOROSCOPIC IMAGING OF A BODY

BACKGROUND OF THE INVENTION

This invention relates to techniques for obtaining radiographic images and, more particularly, to a method and apparatus for obtaining improved radiographic images of opacified anatomy, including information concerning blood flow rate, using a fluoroscopic type of equipment in conjunction with a video processor.

A typical X-ray fluoroscopy apparatus includes an X-ray source and an image intensifier which is used to detect the X-radiation. The output of the image intensifier is viewed by a television camera, and the resultant television signal can be presented on a monitor and/or recorded. When a body, such as that of a patient, is interposed between the X-ray source and the detector, X-rays are absorbed in varying degrees depending upon the thickness and composition of different regions of the body. This results in the presentation of a two-dimensional image that can be used, for example, for diagnosing structural abnormalities within the body.

The ability to "see" structure in the body using the described technique depends on the X-ray absorption properties of the structure of interest in relation to the X-ray absorption properties of the material(s) adjacent to the structure. The greater the difference, the greater the "contrast" the structure of interest will have in the resulting television image. The greater the contrast, the greater the clarity of the structure in the image. Consequently, achieving high contrast is a desirable quality with this imaging procedure.

Radiographic contrast agents are used to create a large difference in X-ray absorption behavior where little or none previously existed. For example, blood vessels are virtually invisible on fluoroscopic images (except in the chest) because blood, muscle, fat and soft tissue all possess similar X-ray absorption behavior. Radiographic contrast agents contain material (e.g. air, barium, iodine) which has X-ray absorption properties dissimilar to blood, muscle, fat and the soft tissue. For example, when a bolus of iodinated liquid contrast material is injected into an artery or vein, the vascular structure is given artificially higher contrast on an X-ray image while the contrast material is present within a certain vascular segment. The contrast agent, flowing along with the blood, rapidly washes out of one segment and moves on to the next. In order to outline large segments of vasculature, large boluses of long duration (several seconds) usually are administered. Since iodinated contrast agents are toxic and present small but significant patient discomfort, as well as some risk of serious complications, only limited quantities are used in common procedures.

In the copending U.S. application Ser. No. 333,558, now U.S. Pat. No. 4,436,095 assigned to the same assignee as the present application, there is disclosed a technique which reduces the amount of contrast material needed for a given procedure, and/or enhances the image which can be obtained when using a given amount of contrast material. This is achieved by storing, at each pixel of a video image, the video signal level representative of the maximum opacification during a sequence of video frames during which the bolus passes through a blood vessel of interest. Since maximum opacification of each portion of the vessel occurs when the concentration of contrast material is greatest, the disclosed technique permits visualization of the vessel as if the contrast material was present throughout at its maximum cencentration.

It is among the objects of the present invention to generate improved processed images of the internal structure of a body, and also to obtain the travel time of blood between selected points in a vessel so that blood flow can be determined.

SUMMARY OF THE INVENTION

The present invention is directed to a method and apparatus for generating a processed video image of a fluid-carrying vessel in a body, and can also be used to obtain information concerning the flow rate of fluid, typically blood, in the vessel. In accordance with the method of the invention, a contrast medium is injected into the body, typically into the vessel to be imaged or leading into the vessel to be imaged. (As used herein "vessel" is intended to mean any one or plurality of fluid-carrying ducts or tubes; particularly, but not limited to, the vascular system.) A source of radiation, typically X-rays, is directed at the body, and radiation which passes through the body is detected and converted into a series of frames of electronic video signals, preferably in digital form. The frames represent images of the radiation transmission characteristics of the body at a series of successive times. Each frame includes an array of pixels, the video level at each pixel of a frame being determined by the radiation transmissivity of the body through an elemental region thereof. The time is determined at which the video signal level at each pixel is indicative of maximum opacification of the elemental body region corresponding to the pixel. A time-representative value is stored, for each pixel, which depends on the determined time. A processed video image can then be displayed which has a video parameter, such as luminance, that depends, at each pixel, on the time-representative value for the pixel.

In the preferred embodiment of the invention, the steps of determining the time at which the video signal level at each pixel is indicative of maximum opacification, and of storing a time-representative value for each pixel, includes the following steps: Time-representative values are generated as a function of time during the sequence. A video frame is stored in a first frame store. The video signal at each pixel of a generated frame is compared with the video signal level at the corresponding pixel of the video frame stored in the first frame store. At each pixel, a video signal is selected which is representative of the lower of the compared video signal levels (i.e., the more opaque). An occurrence indication is generated whenever the video signal level of the pixel of the generated frame is lower than the video signal level of the pixel of the video frame stored in the first frame store. The selected video signal levels are re-stored in the first frame store (which thereby stores the video signal representative of the most opaque condition at each pixel during the sequence). The current time-representative value is stored, in response to an occurrence indication, in the corresponding pixel of a second frame store which is synchronized with the first frame store. The procedure is then repeated for subsequent generated frames.

In the described manner, the processed video image is represented by the time-representative values in the second frame store. These time-representative values indicate the time-to-maximum-opacification for each pixel. When these values are displayed, for example as video luminance levels, the earliest opacified portions will appear, say, black, and the latest opacified portions will appear, say, white, with grey levels in between being indicative of the relative time of opacification for other regions.

In accordance with a further feature of the invention, information concerning blood flow rate can be determined. In particular, after selecting spaced positions of pixels in the vessel, the travel path distance between the selected pixels can be determined. A travel time between the pixels along a selected travel path can be obtained from the stored time-representative values stored in conjunction with the pixels. Since the bolus "wavefront" (i.e., highest concentration of contrast material) travels at substantially the blood velocity in the vessel of interest, one can determine the velocity with which the blood is flowing. If the vessel geometry is then known or observed, a volumeric measure of blood flow can be obtained.

Further features and advantages of the invention will become more readily apparent from the following detailed description when taken in conjunction with the accompanying drawings.

DESCRIPTION OF THE PREFERRED EMBODIMENT

Figure 1:
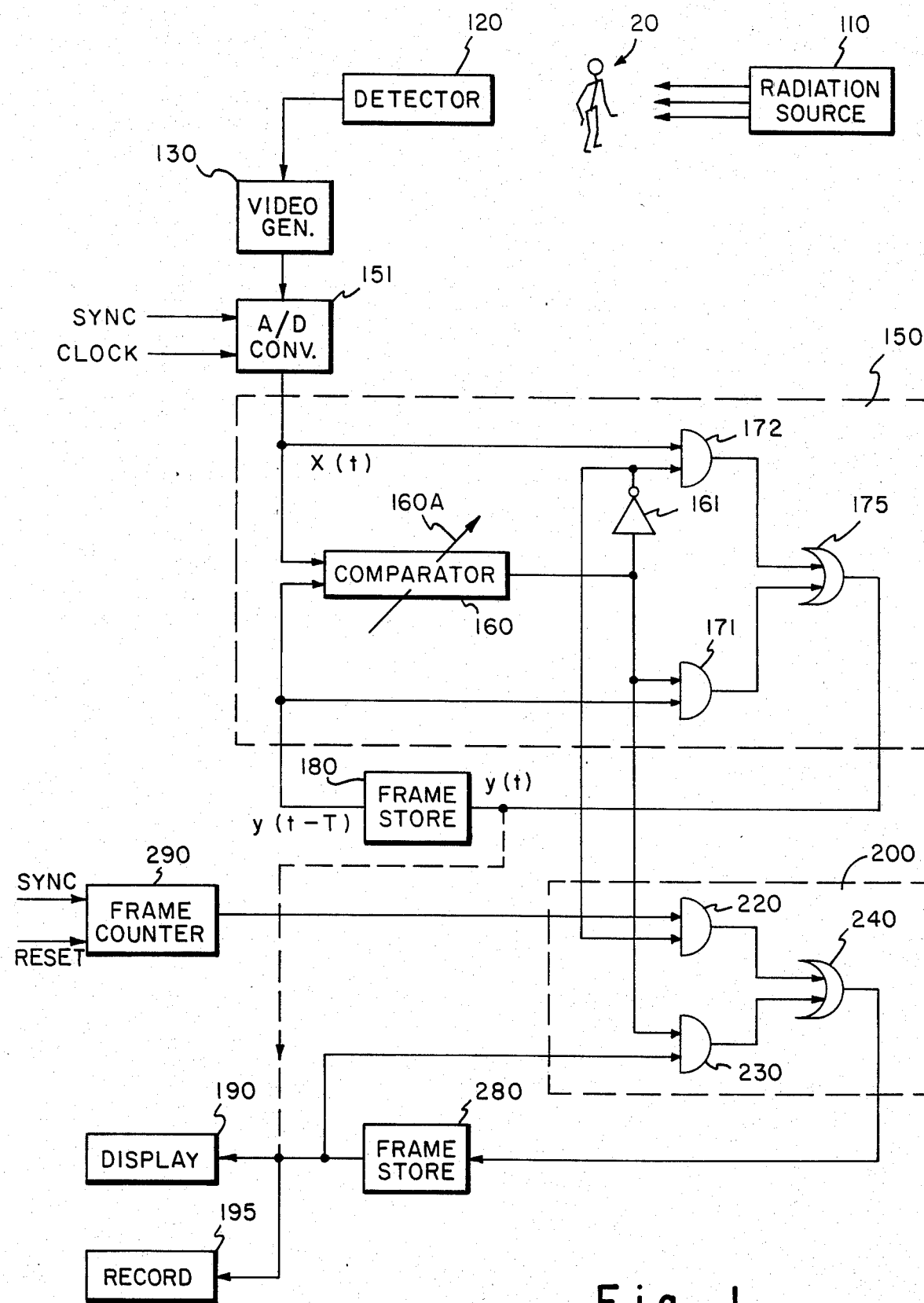
FIG. 1 is a block diagram of an embodiment of an apparatus in accordance with the invention, and which can be used to practice the method of the invention.

Referring to FIG. 1, there is shown a block diagram of an apparatus 100 for obtaining a displayed image of the internal structure of a body 20. The apparatus 100 conventionally includes a radiation source 110, typically an X-ray source, a detector 120, and a video generator 130. The combination of detector and video generator may include, for example, an X-ray image intensifier in conjunction with a television camera. The output of video generator 130 is coupled to an analog-to-digital converter 151 which converts the television signal into digital form. Equipment for obtaining the digitized television signal is well known in the art and commercially available, an example being the model AD-964310 manufactured by Thomson CSF Broadcast, Inc. At each pixel of the video frame, the television signal digitizer generates a digital signal, for example an eight bit digital signal representative of one of 256 gradations of luminance level (for a monochrome signal—as considered in the present illustrated embodiment). The video generator and the analog-to-digital converter conventionally receive synchronizing signals, and the analog-to-digital converter also receives a clock signal at the pixel rate.

The output of analog-to-digital converter 151 is coupled to selection and discrimination circuitry 150 (shown in dashed enclosure) which includes a digital comparator 160, and other elements, as shown, and is operative in conjunction with digital frame store 180. These circuits may operate essentially as described in the above referenced copending U.S. application Ser. No. 333,558, incorporated herein by reference. The comparator 160 receives as one input the output of analog-to-digital converter 151 and as its other input another eight bit digital video signal that is output from the digital frame store 180. The output of the analog-to-digital converter 151 (i.e., the "current" digital video signal at a particular pixel) is designated as $x(t)$, and the output of the digital frame store 180 (i.e. a stored previous minimum digital video signal at the particular pixel of the frame), is designated $y(t-T)$, where T is the time between frames. The comparator 160 operates to generate a "0" output if the input $x(t)$ is the lower of its two inputs, and a "1" output if the input $y(t-T)$ is the lower of its two inputs. The output of the comparator 160 is coupled to the one input of an AND gate 171, and also to one input of another AND gate 172 via an inverter 161. The other input to AND gate 171 is the eight bit signal $y(t-T)$ which is coupled to AND gate 171. The other input to AND gate 172 is the eight bit signal $x(t)$ which is coupled to AND gate 172. [Suitable delays, not shown, can be provided throughout, as is known in the art, to equalize inherent processing timer of individual circuits.] The AND gates 171 and 172, when enabled by their single bit input from comparator 160 (inverted, in the case of the input to AND gate 172), pass their eight bit inputs to an OR gate 175. Since only one of the AND gates 171 or 172 can be enabled at a time, the OR gate 175 operates to pass the eight bit signal from whichever AND gate is enabled. The output of AND gate 175, designated $y(t)$, is the current overall minimum digital video signal for the particular pixel of the frame being processed. This signal is stored at said particular pixel in the digital video frame store 180. (The frame stores hereof may comprise, for example, a model FS-963155 digital video frame store manufactured by Thomson CSF Broadcast, Inc. or, alternatively, may be any suitable memory, such as a random access memory, having pixel addresses that are synchronized with the pixel addresses of the rest of the system by deriving said addresses from common sync and block signals.)

A counter 290 is provided, and is operative to count frames of a processing sequence by being responsive to odd field indications of the synchronizing signals. The counter is reset before the beginning of each sequence. The output of frame counter 290, which is representative of the current frame count, and is a function of the time that has elapsed during the series of frames, is coupled to signal selection circuitry 200, shown in dashed enclosure, which operates in conjunction with digital frame store 280. In particular, the present frame count is coupled to one input of an AND gate 220, the other input of which receives the output of inverter 161 from circuitry 150. The output of AND gate 200 is coupled to one input of an OR gate 240, the output of which is, in turn, coupled to the input of digital frame store 280. Frame store 280 operates in synchronism with frame store 180; i.e., they use the same synchronizing and clock signals, and address corresponding pixels simultaneously. An output of the digital frame store 280 is coupled to one input of an AND gate 230. The other input to gate 230 is the uninverted output of comparator 160, which has a state opposite to that of the signal from inverter 161. The output of AND gate 230 is a second input to OR gate 240.

In operation of the described embodiment, a bolus of contrast material is injected into the vessel or portion of the vascular system to be imaged. Processing is then initiated. The circuitry 150 and the frame store 180 operate generally in the manner set forth in the above referenced copending U.S. application Ser. No. 333,558. In particular, the frame store 180 is initially loaded with values at a level that cause the first digitized video frame to be loaded into the frame store 180. Thereafter, each sequentially digitized frame is compared, pixel-by-pixel with the corresponding pixel in the frame store 180. That is, each pixel $x(t)$ of the current video frame is compared with the corresponding pixel, $y(t-T)$ from the frame store 180. The result of the comparison (by comparator 160) is used to enable either the OR gate 171 (when $y(t-T)$ is lower) or the OR gate 172 (when $x(t)$ is lower) to pass whichever luminance level is lower to the frame store 180 for restorage. Since the lowest luminance value at each pixel represents the highest opacity of the body region corresponding to the pixel, the processed image in frame store 180 is a frame of video information that represents the maximum opacity at each elemental region of the body being viewed during the time the processor is active. An optional processed output (i.e., processed in accordance with the teachings of the above referenced copending U.S. application Ser. No. 333,558), can be taken at $y(t)$ or $y(t-T)$, as shown, and coupled to display 190 and/or recorder 195.

In accordance with the improvement of the invention, the frame store 280 stores a time-representative value (in this embodiment, it is a frame count during the sequence) for each pixel of the frame. The time-representative value represents the time during the sequence at which the video signal level at the particular pixel reached its lowest level; i.e., the time at which the elemental region of the body corresponding to the pixel position was most opaque. In the FIG. 1 embodiment, an indication that the video signal level at a particular pixel is at a new overall minimum value is the presence of a "1" at the output of inverter 161 of circuitry 150. Accordingly, the output of inverter 161 is utilized in circuitry 200 to enable AND gate 220 when a new overall minimum video level is detected, and the uninverted output of comparator 160 is uitilized to enable AND gate 230 in any other case. When AND gate 220 is enabled, the current frame count from counter 290 is stored in the frame store 280 at the particular pixel, whereas when AND gate 230 is enabled, the frame count already stored in the memory is restored at the particular pixel.

In the described manner, the processed video image is represented by the time-representative values in the second frame store. These time-representative values indicate the time-to-maximum-opacification for each pixel. In the present embodiment, when these values are displayed as video luminance levels (e.g. on display 190 or via video recorder 195), the earliest opacified portions will appear black, the latest opacified portions will appear white, with grey levels in between being indicative of the relative time of opacification for other regions.

If desired, the frame store 280 can be initially loaded with time-representative values at any desired grey level. For stationary anatomy, the degree of opacification does not vary substantially during the sequence. If the comparator 160 (FIG. 1) is provided with a threshold difference which must be exceeded before a "0" output is produced (i.e., the opacity must increase by at least a predetermined amount), occurrence indications (at the output of inverter 161) will only occur when the current video signal level at a pixel is less than the previously stored minimum signal level by an amount that exceeds the selected threshold. [The threshold can be variable, as indicated by arrow 160A.] During operation, in those portions of the image through which contrast material is passing, there will be significant increases in opacity at various times during the sequence. Accordingly, the threshold of comparator 160 will be exceeded, and operation will be as described above. However, for those portions of the image wherein the increase in opacity is never sufficient to exceed the threshold of comparator 160, the originally stored luminance level (i.e., the pre-selected grey level), will remain the frame store 280. It can be noted that the preselected background reference level can be chosen at any desired value; for example, maximum contrast with the early part of the bolus wavefront can be obtained using a white background reference level, or maximum contrast with the late part of the bolus wavefront can be obtained by using a black background reference level. It can also be noted that motion of portions of the image, with or without presence of contrast material, may cause those portions of the image to reflect the time at which maximum opacity occurred (if the threshold level is exceeded).

In accordance with a further feature of the invention, information concerning blood flow rate can be determined. The processed video image in digital frame store 280 will ultimately contain, for the pixels within a blood vessel of interest, the time-to-maximum opacification; i.e., time-representative values that indicate the time that the bolus "wavefront" (defined as the highest concentration of contrast material, which results in maximum opacity) traversed each point. Therefore, for two separated points in a blood vessel, the stored time-representative values in the ultimately processed frame can be used to determine the time that it took the bolus wavefront to pass from one such point to the other. For example, if the two pixel positions 1 and 2 have coordinates designated $(x_1, y_1)$ and $(x_2, y_2)$, and their stored time-representative values are designated as $t_1$ and $t_2$, respectively, then the time that it took for the bolus wavefront to travel from point 1 to point 2 would be $t_2-t_1$. Since the bolus "wavefront" travels at substantially the blood velocity in the vessel of interest, one can determine the rate at which the blood is flowing. If the vessel geometry is then known or observed, a volumetric measure of blood flow can be obtained.

Figure 2:
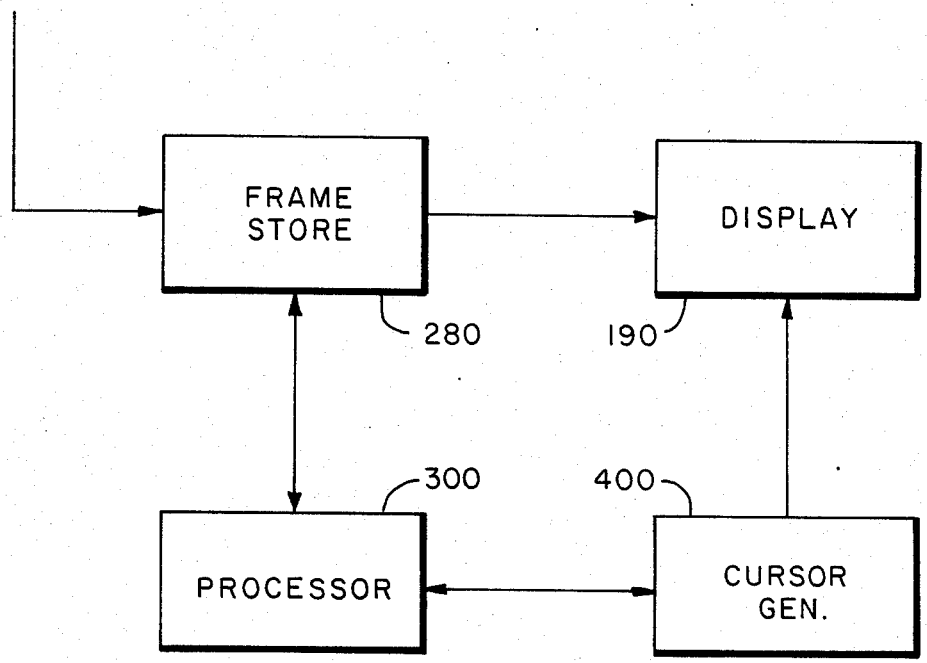
FIG. 2 is a simplified block diagram of a system, for use in conjunction with the FIG. 1 embodiment, for obtaining blood flow rate information.

In FIG. 2, a processor 300 operates in conjunction with frame store 280 (which holds the time-to-maximum-opacification for each pixel), display 190, and a conventional cursor generator 400, to obtain blood flow velocity. The processor 300 may be, for example, a microprocessor programmed in accordance with the routine of FIG. 3. The cursor can be used for operator selection of specific positions or paths on a video display screen. A graphical digitizer (not shown) can be employed, for example, to move the cursor in any desired path on the display screen. Routines are well known in the art (and are not the subject of this invention) for computing the length of a path travelled. Alternatively, light pens are also well known in the art, and can be used, in similar manner, to trace a path directly on the video display, with the length of the path being automatically computed.

Figure 3:
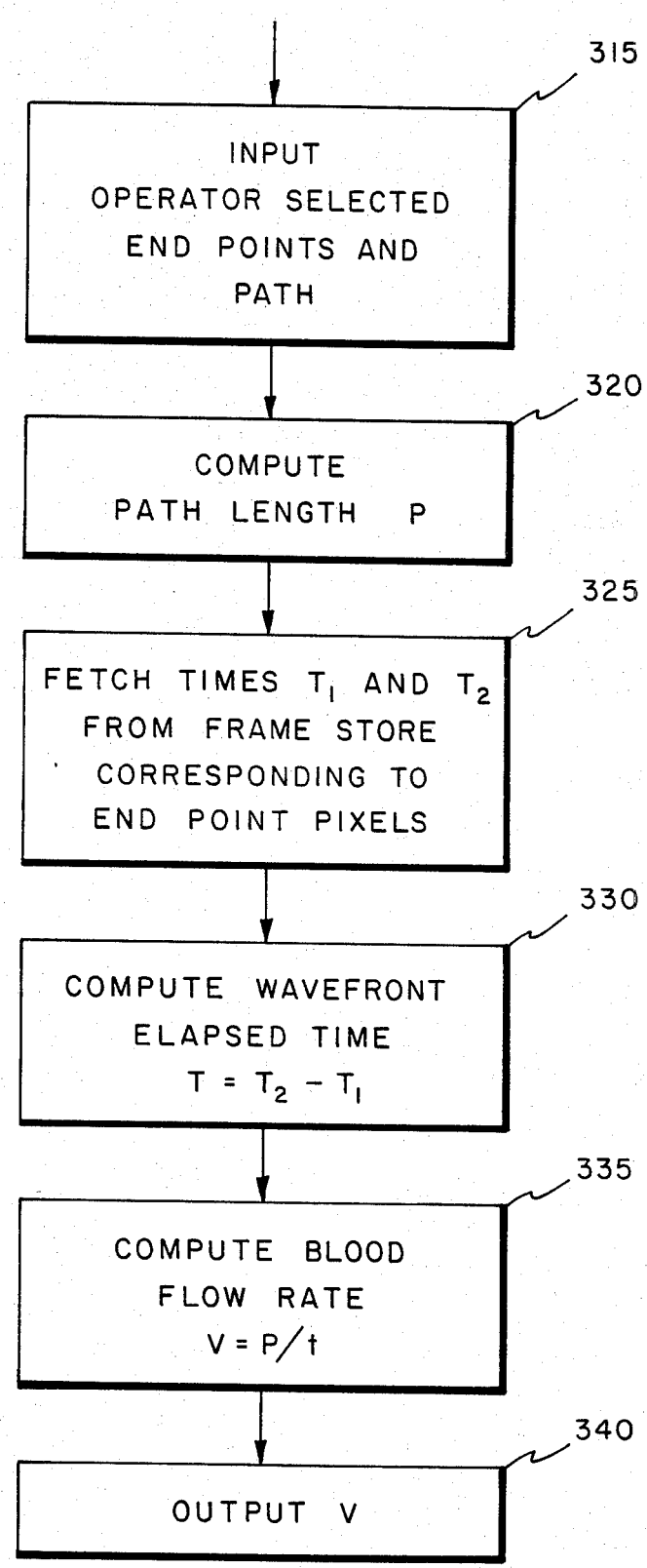
FIG. 3 is a flow diagram of a routine for programming the processor of FIG. 2 to determine blood flow rate using the image stored in one of the FIG. 1 frame stores.

Referring to FIG. 3, there is shown a flow diagram of a routine suitable for programming the processor 300 of FIG. 2 to obtain flood flow rate along a path selected by an operator. Operator-selected end points and path are input (block 315), such as by using the data tablet to trace a selected path on the display 190 as it displays the image ultimately stored in frame store 280. The path length, p, is then computed (block 320), and the times-to-maximum-opacification of the end point pixels, designated $t_1$ and $t_2$, are fetched from frame store 280 (block 325). The bolus wavefront elapsed time is obtained as $t = t_2 - t_1$ (block 330). The blood flow velocity can then be determined as the ratio of path length to time, as represented by the block 335. The output velocity can then be read out (block 340) to the operator via display or other suitable peripheral.

The invention has been described with reference to a particular embodiment, but variations within the spirit and scope of the invention will occur to those skilled in the art. For example, the time-representative values could be displayed as colors, or the luminance levels could decrease, instead of increase, with increasing time-representative values. It will be understood that the processing described herein can be performed for a portion of the area of a full video frame, in which case the frames as defined herein would constitute whatever area is actually being processed. It will also be understood that the processing hereof can be performed on a series of frames taken at successive times at different rotational angles of a fluoroscopic tomography system, as described in the copending U.S. application Ser. No. 444,613, entitled "Apparatus And Method For Cross Sectional Imaging Of A Body", filed of even data herewith, and assigned to the same assignee as the present application.

We claim:

1. A method for generating a processed video image of a fluid-carrying vessel in a body, comprising the steps of:
    injecting a contrast medium to pass into the vessel;
    irradiating the body;
    detecting radiation which passes through the body and generating a series of frames of electronic video signals that represent an image of the radiation transmission characteristics of the body at a series of successive times, each frame including an array of pixels, the video signal level at each pixel being determined by the radiation transmissivity of an elemental region of the body;
    determining the time at which the video signal level at each pixel is indicative of maximum opacification of the elemental body region corresponding to the pixel;
    storing, for each pixel, a time-representative value which depends on the determined time; and
    displaying a processed video image which has a video parameter that depends, at each pixel, on the time-representative value for the pixel.

2. The method as defined by claim 1, wherein said video parameter is video luminance level.

3. The method as defined by claim 1, wherein said steps of determining the time at which the video signal level at each pixel is indicative of maximum opacification, and storing a time-representative value for each pixel, includes the steps of:
    generating time-representative values as a function of time during the sequence;
    storing a video frame in a first frame store;
    comparing the video signal level at each pixel of a generated frame with the video signal level at the corresponding pixel of the video frame stored in the first frame store;
    selecting at each of said pixels a video signal level representative of the lower of the compared video signal levels;
    generating an occurrence indication whenever the video signal level of the pixel of the generated frame is lower than the video signal level of the pixel of the video frame stored in the first frame store;
    re-storing the selected video signal levels in the first frame store;
    storing the current time-representative value, in response to an occurrence indication, at the corresponding pixel of a second frame store synchronized with the first frame store; and
    repeating the comparing and subsequent steps for subsequent generated frames;
    whereby the processed video image will be represented by the time-representative values in the second frame store.

4. The method as defined by claim 2, wherein said steps of determining the time at which the video signal level at each pixel is indicative of maximum opacification, and storing a time-representative value for each pixel, includes the steps of:
    generating time-representative values as a function of time during the sequence;
    storing a video frame in a first frame store;
    comparing the video signal level at each pixel of a generated frame with the video signal level at the corresponding pixel of the video frame stored in the first frame store;
    selecting at each of said pixels a video signal level representative of the lower of the compared video signal levels;
    generating an occurrence indication whenever the video signal level of the pixel of the generated frame is lower than the video signal level of the pixel of the video frame stored in the first frame store;
    re-storing the selected video signal levels in the first frame store;
    storing the current time-representative value, in response to an occurrence indication, at the corresponding pixel of a second frame store synchronized with the first frame store; and
    repeating the comparing and subsequent steps for subsequent generated frames;
    whereby the processed video image will be represented by the time-representative values in the second frame store.

5. The method as defined by claim 4, wherein the initial reference values in said second frame store are representative of a selected video level, and wherein said occurrence indication is generated only when the video signal level of the pixel of the generated frame is lower by at least a predetermined amount than the video signal at the corresponding pixel of the video frame stored in the first frame store.

6. The method as defined by claim 1, further comprising the steps of determining a travel path distance between selected pixels in said vessel on the processed video image; and determining a travel time between said pixels along said path from the time-representative values stored in conjunction therewith.

7. The method as defined by claim 2, further comprising the steps of determining a travel path distance between selected pixels in said vessel on the processed video image; and determining a travel time between said pixels along said path from the time-representative values stored in conjunction therewith.

8. The method as defined by claim 6, further comprising the step of deriving flow rate in said vessel from said travel path distance and said travel time.

9. The method as defined by claim 7, further comprising the step of deriving flow rate in said vessel from said travel path distance and said travel time.

10. Apparatus for generating a processed video signal representative of an image of a body, comprising:

a source of radiation directable at the body;

means for detecting radiation which passes through the body and for generating a series of frames of electronic video signals that represent an image of the radiation transmission characteristics of the body at a series of successive times, each frame including an array of pixels, the video signal level at each pixel being determined by the radiation transmissivity of an elemental region of the body;

means for determining the time at which the video signal level at each pixel is indicative of maximum opacification of the elemental body region corresponding to the pixel;

means for storing, for each pixel, a time-representative value which depends on the determined time; and means for displaying a processed video image which has a video parameter that depends, at each pixel, on the time-representative value for the pixel.

11. Apparatus as defined by claim 10, wherein said video parameter is video luminance level.

12. Apparatus as defined by claim 10, wherein said means for determining the time at which the video signal level at each pixel is indicative of maximum opacification, and the means for storing a time-representative value for each pixel, comprise:

means for generating time-representative values as a function of time during the sequence;

a first frame store;

a second frame store synchronized with the first frame store;

means for comparing the video signal level at each pixel of a generated frame with the video signal level at the corresponding pixel of a video frame stored in the first frame store, and for selecting at each of said pixels a video signal level representative of the lower of the compared video signal levels;

means for generating an occurrence indication whenever the video signal level of the pixel of the generated frame is lower than the video signal level of the pixel of the video frame stored in the first frame store;

means for re-storing the selected video signal levels in the first frame store; and means responsive to occurrence indications for storing the current time-representative value at the corresponding pixel of the second frame store;

whereby the processed video image will be represented by the time-representative values in the second frame store.

13. Apparatus as defined by claim 11, wherein said means for determining the time at which the video signal level at each pixel is indicative of maximum opacification, and the means for storing a time-representative value for each pixel, comprise:

means for generating time-representative values as a function of time during the sequence;

a first frame store;

a second frame store synchronized with the first frame store;

means for comparing the video signal level at each pixel of a generated frame with the video signal level at the corresponding pixel of a video frame stored in the first frame store, and for selecting at each of said pixels a video signal level representative of the lower of the compared video signal levels;

means for generating an occurrence indication whenever the video signal level of the pixel of the generated frame is lower than the video signal level of the pixel of the video frame stored in the first frame store;

means for re-storing the selected video signal levels in the first frame store; and means responsive to occurrence indications for storing the current time-representative value at the corresponding pixel of the second frame store;

whereby the processed video image will be represented by the time-representative values in the second frame store.

14. For use in conjunction with an imaging system, including a source of radiation directable at a body; detection means for detecting radiation which passes through the body; and a display; an apparatus for generating a processed video signal representative of an image of the body; comprising:

means for detecting radiation which passes through the body and for generating a series of frames of electronic video signals that represent an image of the radiation transmission characteristics of the body at a series of successive times, each frame including an array of pixels, the video signal level at each pixel being determined by the radiation transmissivity of an elemental region of the body;

means for determining the time at which the video signal level at each pixel is indicative of maximum opacification of the elemental body region corresponding to the pixel;

means for storing, for each pixel, a time-representative value which depends on the determined time; and means for displaying a processed video image which has a video parameter that depends, at each pixel, on the time-representative value for the pixel.

15. Apparatus as defined by claim 14, wherein said video parameter is video luminance level.

16. Apparatus as defined by claim 14, wherein said means for determining the time at which the video signal level at each pixel is indicative of maximum opacification, and the means for storing a time-representative value for each pixel, comprise:

means for generating time-representative values as a function of time during the sequence;

a first frame store;

a second frame store synchronized with the first frame store;

means for comparing the video signal level at each pixel of a generated frame with the video signal level at the corresponding pixel of a video frame stored in the first frame store, and for selecting at each of said pixels a video signal level representative of the lower of the compared video signal levels;

means for generating an occurrence indication whenever the video signal level of the pixel of the generated frame is lower than the video signal level of the pixel of the video frame stored in the first frame store;

means for re-storing the selected video signal levels in the first frame store; and means responsive to occurrence indications for storing the current time-representative value at the corresponding pixel of the second frame store;

whereby the processed video image will be represented by the time-representative values in the second frame store.

17. Apparatus as defined by claim 15, wherein said means for determining the time at which the video signal level at each pixel is indicative of maximum opacification, and the means for storing a time-representative value for each pixel, comprise:

means for generating time-representative values as a function of time during the sequence;

a first frame store;

a second frame store synchronized with the first frame store;

means for comparing the video signal level at each pixel of a generated frame with the video signal level at the corresponding pixel of a video frame stored in the first frame store, and for selecting at each of said pixels a video signal level representative of the lower of the compared video signal levels;

means for generating an occurrence indication whenever the video signal level of the pixel of the generated frame is lower than the video signal level of the pixel of the video frame stored in the first frame store;

means for re-storing the selected video signal level in the first frame store; and means responsive to occurrence indications for storing the current time-representative value at the corresponding pixel of the second frame store;

whereby the processed video image will be represented by the time-representative values in the second frame store.

* * * * *